*US011491431B2*

US 11,491,431 B2

(12) United States Patent
Rollo et al.

(10) Patent No.: US 11,491,431 B2
(45) Date of Patent: Nov. 8, 2022

(54) BICYCLE MOUNTED AIR FILTER

(71) Applicants: Tomas Arevalo, Boston, MA (US); Ulysses Richard Brenzel, Boston, MA (US); Thomas Garity, Boston, MA (US); Elizabeth Goodfield, Boston, MA (US); Vincent Eric Hock, Boston, MA (US); Rachel Kim, Boston, MA (US); Rick Yuanzheng Li, Boston, MA (US); Benjamin Harper Nigrovic, Brookline, MA (US); Ludovico Rollo, Boston, MA (US); David Andrew Ziwei Xie, Boston, MA (US); Alexander Young, Boston, MA (US); Genevieve Youngman, Boston, MA (US)

(72) Inventors: Ludovico Rollo, Boston, MA (US); Tomas Arevalo, Boston, MA (US); Thomas Garity, Boston, MA (US); Elizabeth Goodfield, Boston, MA (US); Brian J. O'Rourke, III, Boston, MA (US); Luke Randolph, Boston, MA (US); Allegra Rollo, Boston, MA (US)

(73) Assignees: Tomas Arevalo, Boston, MA (US); Ulysses Richard Brenzel, Boston, MA (US); Thomas Garity, Boston, MA (US); Elizabeth Goodfield, Boston, MA (US); Vincent Eric Hock, Boston, MA (US); Rachel Kim, Boston, MA (US); Rick Yuanzheng Li, Boston, MA (US); Benjamin Harper Nigro Vic, Brookline, MA (US); Ludovico Rollo, Boston, MA (US); David Andrew Ziwei Xie, Boston, MA (US); Alexander Young, Boston, MA (US); Genevieve Youngman, Boston, MA (US)

(*) Notice: Subject to any disclaimer, the term of this patent is extended or adjusted under 35 U.S.C. 154(b) by 319 days.

(21) Appl. No.: 16/811,752

(22) Filed: Mar. 6, 2020

(65) Prior Publication Data
US 2021/0276652 A1 Sep. 9, 2021

(51) Int. Cl.
B01D 46/00 (2022.01)
B62J 40/00 (2020.01)
(Continued)

(52) U.S. Cl.
CPC ..... *B01D 46/0005* (2013.01); *B01D 46/0036* (2013.01); *B01D 46/543* (2013.01);
(Continued)

(58) Field of Classification Search
CPC ... B62J 11/00; B62J 40/00; B62J 99/00; B62J 6/03; B01D 46/0005; B01D 46/0036;
(Continued)

(56) References Cited

U.S. PATENT DOCUMENTS

D393,901 S 4/1998 Kuhn
6,277,178 B1 * 8/2001 Holmquist-Brown ..... A62B 23/02
128/206.28
(Continued)

FOREIGN PATENT DOCUMENTS

CN 203946207 U * 11/2014 ..... B01D 46/10
CN 203946207 U * 11/2014 ..... B01D 46/10
(Continued)

OTHER PUBLICATIONS

CN104787171 A_Eng (Espacenet machine translation of Lu) (Year: 2015).*
(Continued)

*Primary Examiner* — Gabriel E Gitman
(74) *Attorney, Agent, or Firm* — Wolf, Greenfield & Sacks, P.C.

(57) ABSTRACT

An air filter assembly for a bicycle is disclosed. The air filter assembly includes a body having a bracket and a frame. The bracket is configured to mount to a bicycle frame. The frame defines a tapered opening having a windward side and a leeward side. The tapered opening is larger on the windward side than on the leeward side. A removable air filter cartridge is mounted within the opening of the frame such that a force acting on the air filter cartridge on the windward side tends to wedge the air filter cartridge in the opening. A foam member is attached to an outer periphery of the air filter cartridge and is disposed between the air filter cartridge and (Continued)

the frame. The foam member is compressible so as to hold the air filter cartridge in the opening of the frame. The foam member compresses to a greater degree on the leeward side of the opening than on the windward side of the opening. The air filter assembly is mountable to a handle bar of a bicycle.

16 Claims, 7 Drawing Sheets

(51) Int. Cl.
  *F16B 2/06* (2006.01)
  *B62J 11/00* (2020.01)
  *B01D 46/54* (2006.01)
  *B01D 53/04* (2006.01)
  *B01D 46/10* (2006.01)

(52) U.S. Cl.
  CPC ........... *B01D 53/0415* (2013.01); *B62J 11/00* (2013.01); *B62J 40/00* (2020.02); *B01D 46/10* (2013.01); *B01D 2253/102* (2013.01); *B01D 2257/708* (2013.01); *B01D 2257/90* (2013.01); *B01D 2259/4558* (2013.01); *B01D 2259/4566* (2013.01); *B01D 2279/40* (2013.01); *F16B 2/065* (2013.01)

(58) Field of Classification Search
  CPC .. B01D 46/10; B01D 46/543; B01D 53/0415; B01D 2253/102; B01D 2257/708; B01D 2257/90; B01D 2259/4558; B01D 2259/4566; B01D 2279/40; F24F 13/28; A62B 23/00; A62B 23/02; A62B 23/025; A62B 23/06; B62K 19/00; F16B 2/06; F16B 2/065; F16B 2/10; F16B 2/12
  See application file for complete search history.

(56) References Cited

U.S. PATENT DOCUMENTS

| | | | |
|---|---|---|---|
| 6,793,702 | B2 | 9/2004 | Eswarappa |
| D583,037 | S | 12/2008 | Kenny |
| D588,688 | S | 3/2009 | Lablaine |
| 9,161,110 | B1 * | 10/2015 | Patsis ................... H04R 1/026 |
| D768,113 | S | 10/2016 | Lee et al. |
| D807,215 | S | 1/2018 | Martin et al. |
| D822,004 | S | 7/2018 | Tan |
| D834,771 | S | 11/2018 | Theno |
| D898,787 | S | 10/2020 | Fornander et al. |
| D926,303 | S | 7/2021 | Cho |
| 2003/0012680 | A1 | 1/2003 | Balsys |
| 2009/0211581 | A1 * | 8/2009 | Bansal ................... B32B 5/026 |
| | | | 128/205.29 |
| 2012/0153038 | A1 | 6/2012 | Willert |
| 2014/0079264 | A1 | 3/2014 | Minarik et al. |

FOREIGN PATENT DOCUMENTS

| | | | | |
|---|---|---|---|---|
| CN | 203946207 | U | | 11/2014 |
| CN | 203969286 | U | | 12/2014 |
| CN | 203969340 | U | | 12/2014 |
| CN | 204223072 | U | | 3/2015 |
| CN | 104787171 | A | * | 7/2015 ............. B62J 99/00 |
| CN | 105890073 | A | * | 8/2016 ............. F24F 11/30 |
| CN | 205516055 | U | | 8/2016 |
| CN | 106828703 | A | * | 6/2017 ............. A62B 7/10 |
| CN | 107158860 | A | | 9/2017 |
| CN | 108162679 | A | | 6/2018 |
| CN | 108163112 | A | * | 6/2018 ............ B01D 46/12 |
| CN | 109533145 | A | | 3/2019 |
| DE | 20004315 | U1 | * | 7/2000 ............. B62J 99/00 |
| DE | 20004315 | U1 | * | 7/2000 ............. B62J 40/10 |
| GB | 2316324 | A | | 2/1998 |

OTHER PUBLICATIONS

CN105890073A_Eng (Espacenet machine translation of Yang) (Year: 2016).*
CN106828703A_Eng (Espacenet machine translation of Wu) (Year: 2017).*
CN108163112A_Eng (Espacenet machine translation of Deng) (Year: 2018).*
DE20004315U1_Eng (Manual machine translation of Gribov) (Year: 2000).*
DE20004315U1_Eng (Espacenet machine translation of Gribov) (Year: 2000).*
CN203946207U_Eng (Espacenet machine translation of Liang) (Year: 2014).*

* cited by examiner

BICYCLE MOUNTED AIR FILTER

FIELD

Disclosed embodiments are related to an air filter mountable to a bicycle.

BACKGROUND

Air quality is important. Though measures have been taken to increase air quality, further improvements can be made. This is especially true in urban settings. The Assignees of the present application are Tomas Arevalo, Ulysses Richard Brenzel, Thomas Garity, Elizabeth Goodfield, Vincent Eric Hock, Rachel Kim, Rick Yuanzheng Li, Benjamin Harper Nigrovic, Ludovico Alessandro Rollo, David Andrew Ziwei Xie, Alexander Young, Genevieve Youngman.

SUMMARY

In one embodiment, an air filter assembly is provided. The air filter assembly includes a body having a bracket and a frame. The bracket is constructed and arranged to mount to a bicycle. The frame defines a tapered opening having a windward side and a leeward side. The tapered opening is larger on the windward side than on the leeward side. A removable air filter cartridge is mounted within the opening of the frame such that a force acting on the air filter cartridge on the windward side tends to wedge the air filter cartridge in the opening.

In another embodiment, an air filter assembly is provided. The air filter assembly includes a body having a bracket and a frame. The bracket is constructed and arranged to mount to a bicycle. The frame defines a tapered opening having a windward side and a leeward side. The tapered opening being larger on the windward side than on the leeward side. A removable air filter cartridge is mounted within the opening of the frame such that a force acting on the air filter cartridge on the windward side tends to wedge the air filter cartridge in the opening. The air filter cartridge includes a first side and a second side, with the first side of the air filter cartridge including a filter membrane and the second side of the air filter cartridge including activated carbon. The air filter cartridge is mounted into the opening such that the first side of the air filter cartridge is positioned on the windward side and the second side of the air filter cartridge is positioned on the leeward side. A foam member is attached to an outer periphery of the air filter cartridge and is disposed between the air filter cartridge and the frame. The foam member is compressible so as to hold the air filter cartridge in the opening of the frame. The foam member compresses to a greater degree on the leeward side of the opening than on the windward side of the opening.

In yet another embodiment, an air filter assembly is provided. The air filter assembly includes a body having a bracket and a frame. The bracket is constructed and arranged to mount to a bicycle. The bracket includes a first bracket piece integrally mounted to the frame and a second bracket piece fastenable to the first bracket piece. The first bracket piece and the second bracket piece define a hinge end. The hinge end is constructed and arranged to allow the second bracket piece to move relative to the first bracket piece and to be removed from the first bracket piece. The first bracket piece and the second bracket piece define a fastener end, with the fastener end being constructed and arranged to receive a removable fastener. The frame defines a tapered opening having a windward side and a leeward side. The tapered opening is larger on the windward side than on the leeward side. The tapered opening is round and has a first diameter on the windward side and a second diameter on the leeward side, with the first diameter being greater than the second diameter. A removable air filter cartridge is mounted within the opening of the frame such that a force acting on the air filter cartridge on the windward side tends to wedge the air filter cartridge in the opening. The air filter cartridge includes a first side and a second side. The first side of the air filter cartridge includes a filter membrane and the second side of the air filter cartridge includes activated carbon. The air filter cartridge is mounted into the opening such that the first side of the air filter cartridge is positioned on the windward side and the second side of the air filter cartridge is positioned on the leeward side. A foam member is attached to an outer periphery of the air filter cartridge and is disposed between the air filter cartridge and the frame. The foam member is compressible so as to hold the air filter cartridge in the opening of the frame. The foam member compresses to a greater degree on the leeward side of the opening than on the windward side of the opening. The air filter assembly is mountable to a handle bar of a bicycle and such that the frame is positioned downward.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The inventors have recognized the benefits of an air filter that can be mounted to a bicycle to clean the environmental air during use of the bicycle. The air filter may be effective at trapping particulates and/or odors that would otherwise result in low air quality. The inventors have found that the many bicycles used in and around urban and suburban areas may utilize from the air filter disclosed herein in order to improve air quality. The air filter may be formed as an assembly of a frame and an air filter cartridge. The frame can mount to the bicycle and the cartridge can be installed in the frame. The air filter cartridge may be removed and replaced as needed. The air filter cartridge may include a filter membrane on one side and activated carbon on the other side.

The inventors have found that the frame may be configured such that the cartridge is more easily installed when inserted in the frame in one direction than in the other direction. In this regard, a force acting on one side of the cartridge will tend to wedge the cartridge into the frame. To accomplish this, the frame is constructed with a tapered opening. Thus, a wind force exerted on the cartridge will help to further secure the cartridge within the opening of the frame. A foam material may be disposed about cartridge so that the foam is more compressed on the smaller side of the tapered opening than on the larger side.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
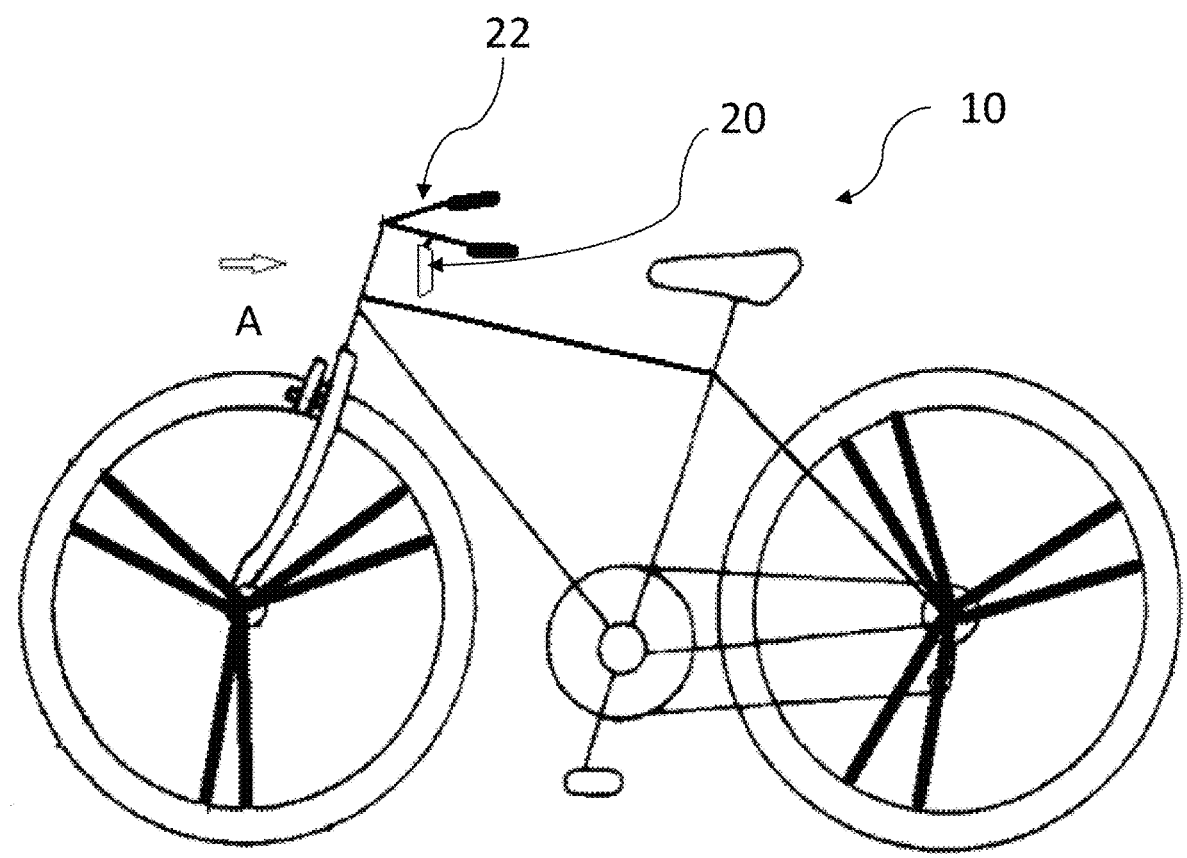
FIG. 1 is a schematic view of a bicycle air filter mounted to a bicycle.

FIG. 1 illustrates a bicycle 10 having an air filter 20 mounted to a bicycle handle bar 22. As a rider rides the bicycle, air (shown as arrow A) can enter or impinge the air filter 20 whereby the air filter can remove particulates and/or odors from the air. Though the air filter is shown as being mounted to the handle bar, the present disclosure is not so limited, and the air filter may be mounted to any other suitable portion of the bicycle. Further, though the air filter is shown such that the air filter is positioned downward (that is, such that the air filter extends downward below the bar), the present disclosure is no so limited, and the air filter may be positioned upward.

It should be appreciated that the term "bicycle" as used herein is not limited to a two-wheeled human-powered personal vehicle and instead the term "bicycle" is defined herein to mean the two-wheeled personal vehicle shown in FIG. 1, as well as any other single or multi-wheeled vehicle including but not limited to a tricycle, a quadricycle, a unicycle, all whether for use with one or multiple persons, and such a "bicycle" may be human-powered or an alternative energy powered, such as by electrical power.

Figure 2:
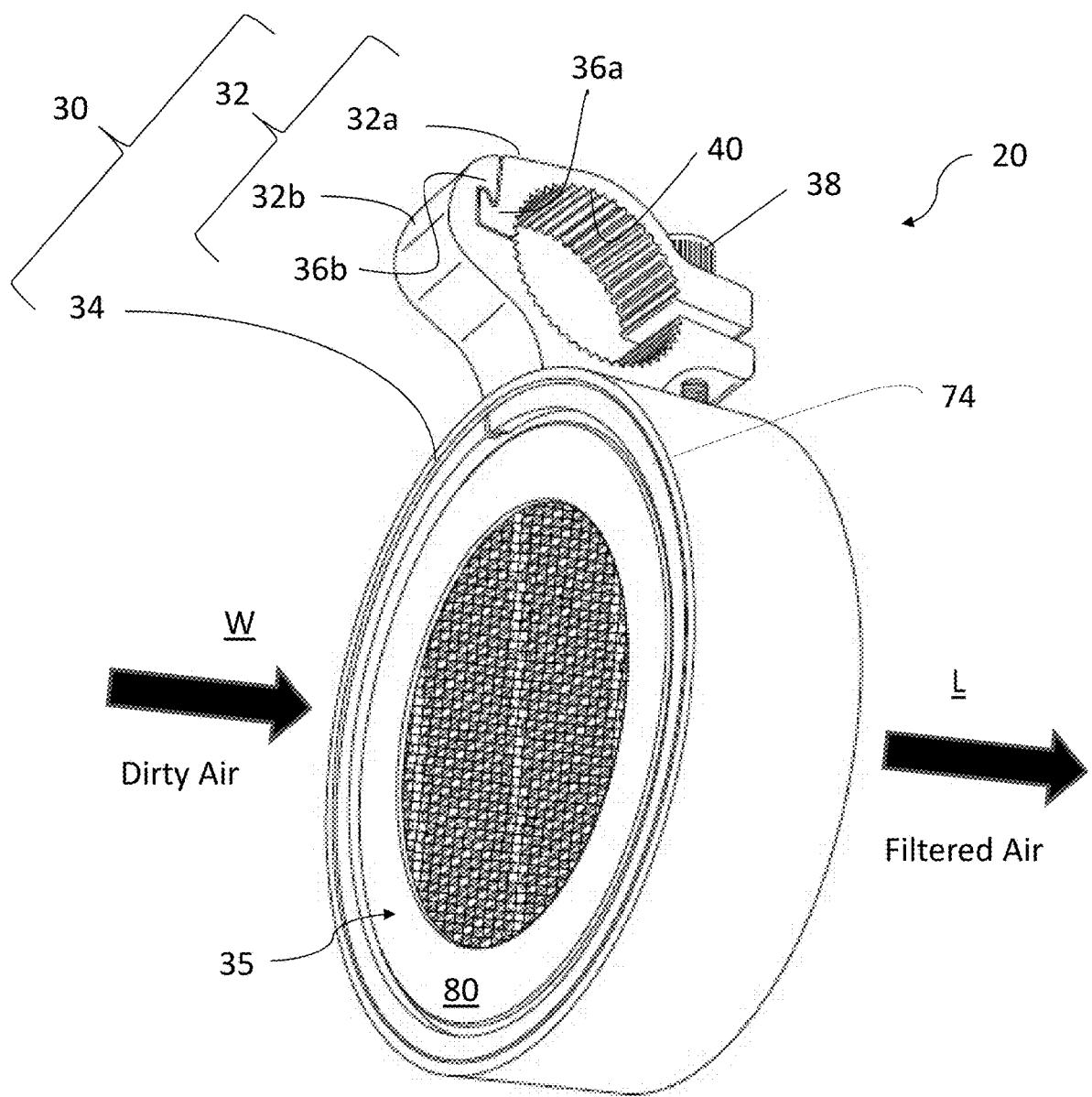
FIG. 2 is a perspective view of the bicycle air filter.

Turning to FIG. 2, a perspective view of the air filter 20 is shown. The air filter 20 may be formed as an assembly that includes a body 30 having a bracket 32 and a frame 34. The frame 34 holds an air filter cartridge 35 as will be explained in more detail below. In one embodiment, the bracket 32 includes two pieces. A first movable piece 32a and a second piece 32b that remains stationary relative to the frame 34. Piece 32b may be formed integral with the frame 30 either by casting the frame and bracket as a monolithic structure or by attaching the bracket to the frame via welding or gluing. In the embodiment shown, the bracket and frame are formed of a suitable material such as aluminum. Also, in one embodiment, the bracket piece 32b and frame 34 are welded together. The bracket and/or frame may be formed of other suitable materials such as plastic.

The bracket pieces 32a and 32b cooperate with each other to clamp around a suitable portion of the bicycle, such as the handle bar as described above. In the depicted embodiment, the bracket pieces 32a and the bracket piece 32b include complementary hinge sections 36a, 36b that interact with each other to hold the pieces 32a, 32b together. The hinge pieces allow relative movement of the bracket pieces. Opposite the hinge sections, the bracket pieces include holes (not shown) to receive a suitable fastener such as screw 38. One of the holes is threaded to receive the threaded section of the fastener. In the embodiment depicted, the threaded hole is formed in the bracket piece 32b and a clearance hole is formed in bracket piece 32a, though the threaded hole may be formed in bracket piece 32a and the clearance hole may be formed in the bracket piece 32b.

Figure 5:
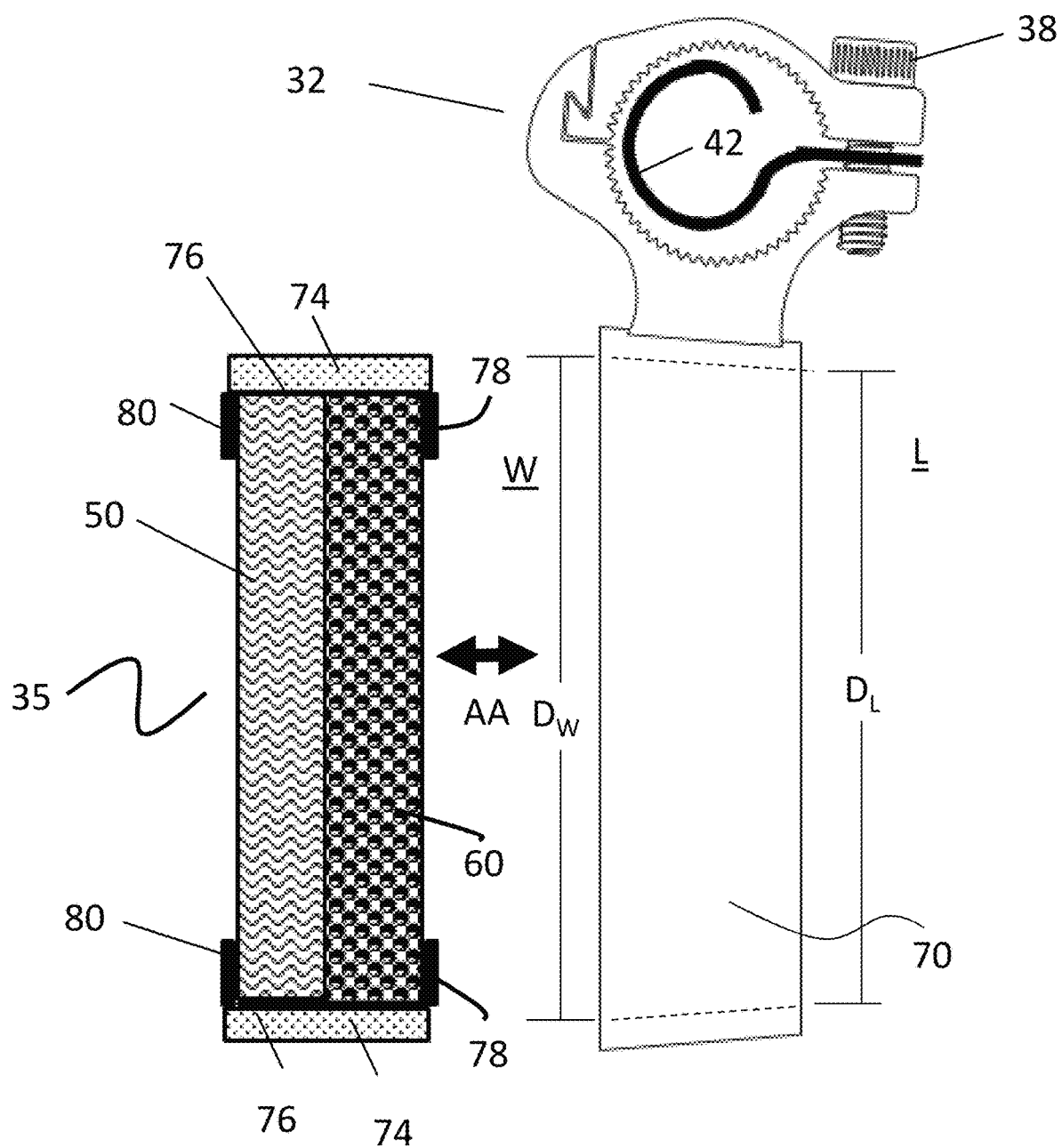
FIG. 5 is an exploded side view of the bicycle air filter of FIG. 2.
Figure 6:
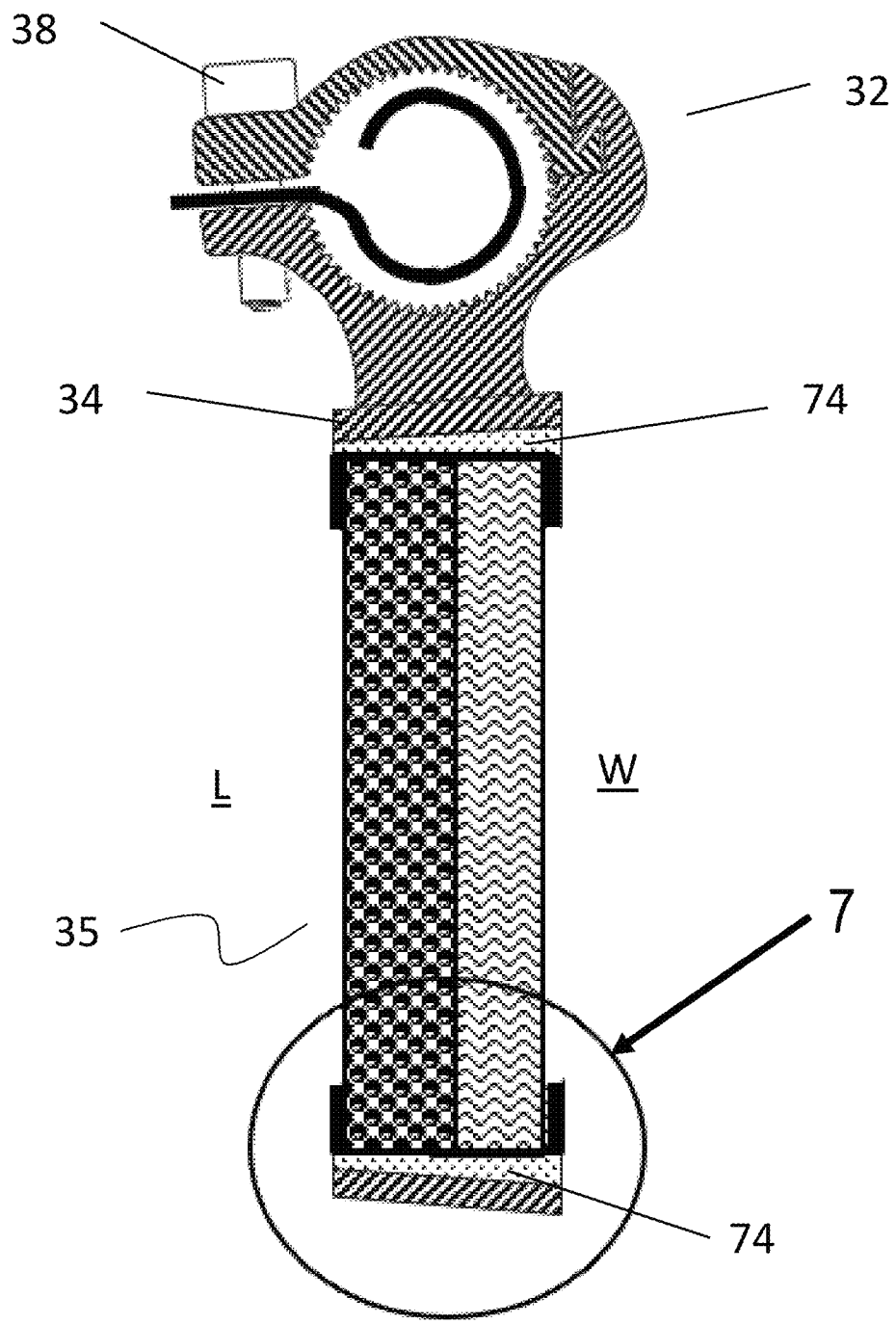
FIG. 6 is a cross-sectional view taken along line 6-6 of FIG. 3.

To enhance the mountability, one or both of the inner surfaces of pieces 32a, 32b that engage the handle bar is formed with serrations 40. Further, as depicted, the engagement surfaces are formed as semi-circular to correspond with the shape of the handle bar. Of course, any other suitable shape for the engagement surface may be utilized, regardless of the shape of the handle bar. As shown in FIGS. 5 and 6, the bracket may also include a rubber strap that can be positioned between the handle bar and the bracket to further enhance the grip. Accordingly, a user simply unscrews the fastener such that bracket 32a can rotate about bracket 32b (or separate altogether from bracket piece 32b). The bracket 32b is then held against the lower side of the handle bar. Bracket piece 32a is then rotated toward bracket piece 32b (or otherwise attached to bracket piece 32b) at the hinge sections 36a, 36b and the screw is inserted through the clearance hole of bracket piece 32a and screwed into threaded hole formed in bracket piece 32b. A suitable tool, such as a screwdriver or allen wrench may be used to tighten the screw and thus the bracket pieces together in order to hold the filter to the bicycle.

Once the filter is mounted to the bicycle, when the bicycle is ridden, dirty air can enter the filter on the windward side W and cleaner air exits the filter on the leeward side L.

Figure 3:
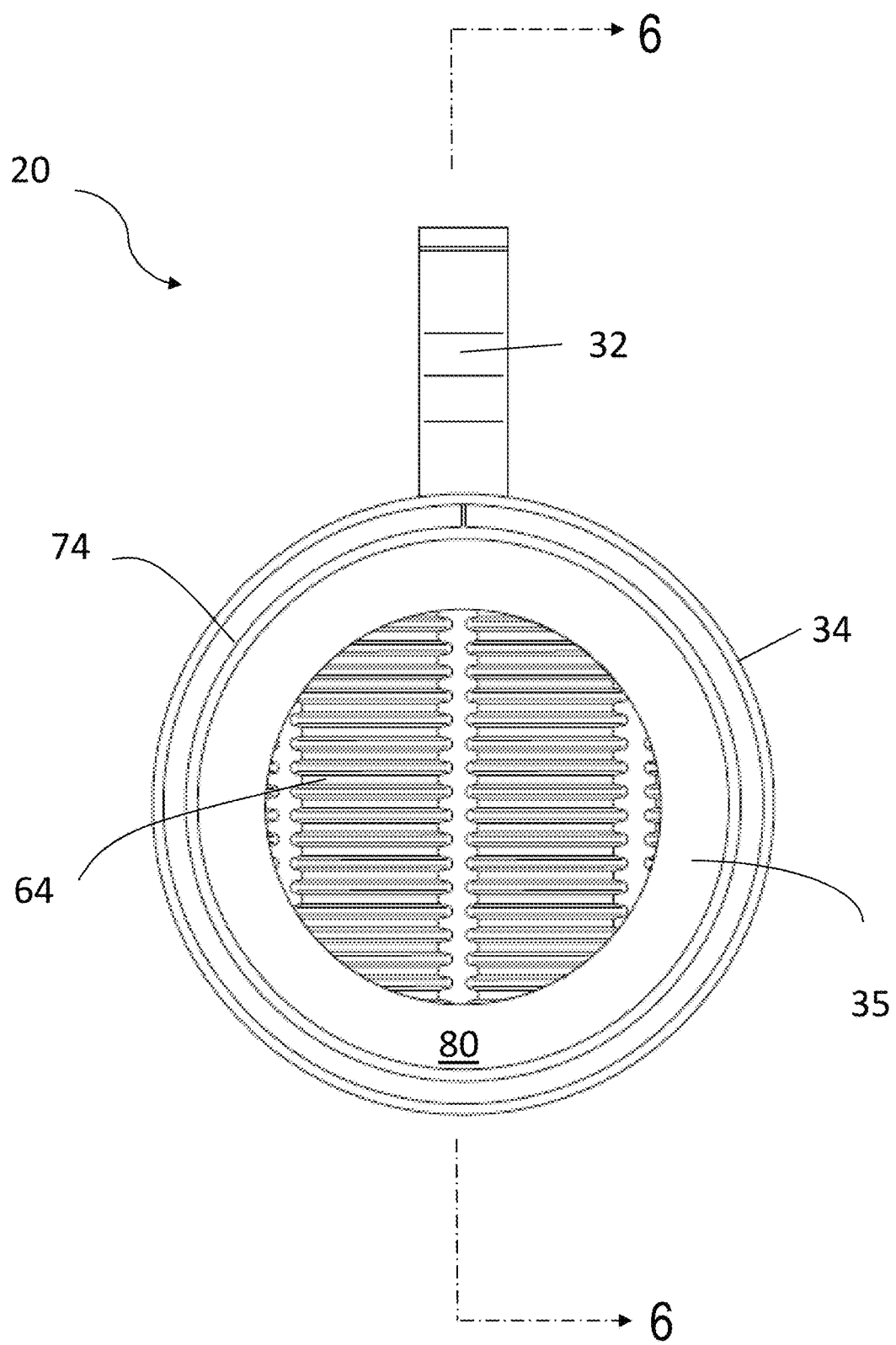
FIG. 3 is a front view of the bicycle air filter of FIG. 2.

Turning to FIG. 3, a front view of the air filter is shown. As can be seen, the filter cartridge 35 is mounted in the frame 34. The filter cartridge includes a filter membrane 50 positioned on the windward side W. The membrane 50 may be formed as a pleated fabric or paper filter having alternating folds as in an accordion structure, as is well known to one of skill in the art. The membrane 50 is constructed to trap and therefore filter larger particulates. Though a screen is shown over the membrane in FIG. 2, no screen is needed and thus as shown in FIG. 3, the cartridge lacks a screen. Membrane 50 may be formed as a pleated fabric or paper filter having alternating folds as in an accordion structure, as is well known to one of skill in the art. The membrane 50 is constructed to trap and therefore filter larger particulates.

Figure 4:
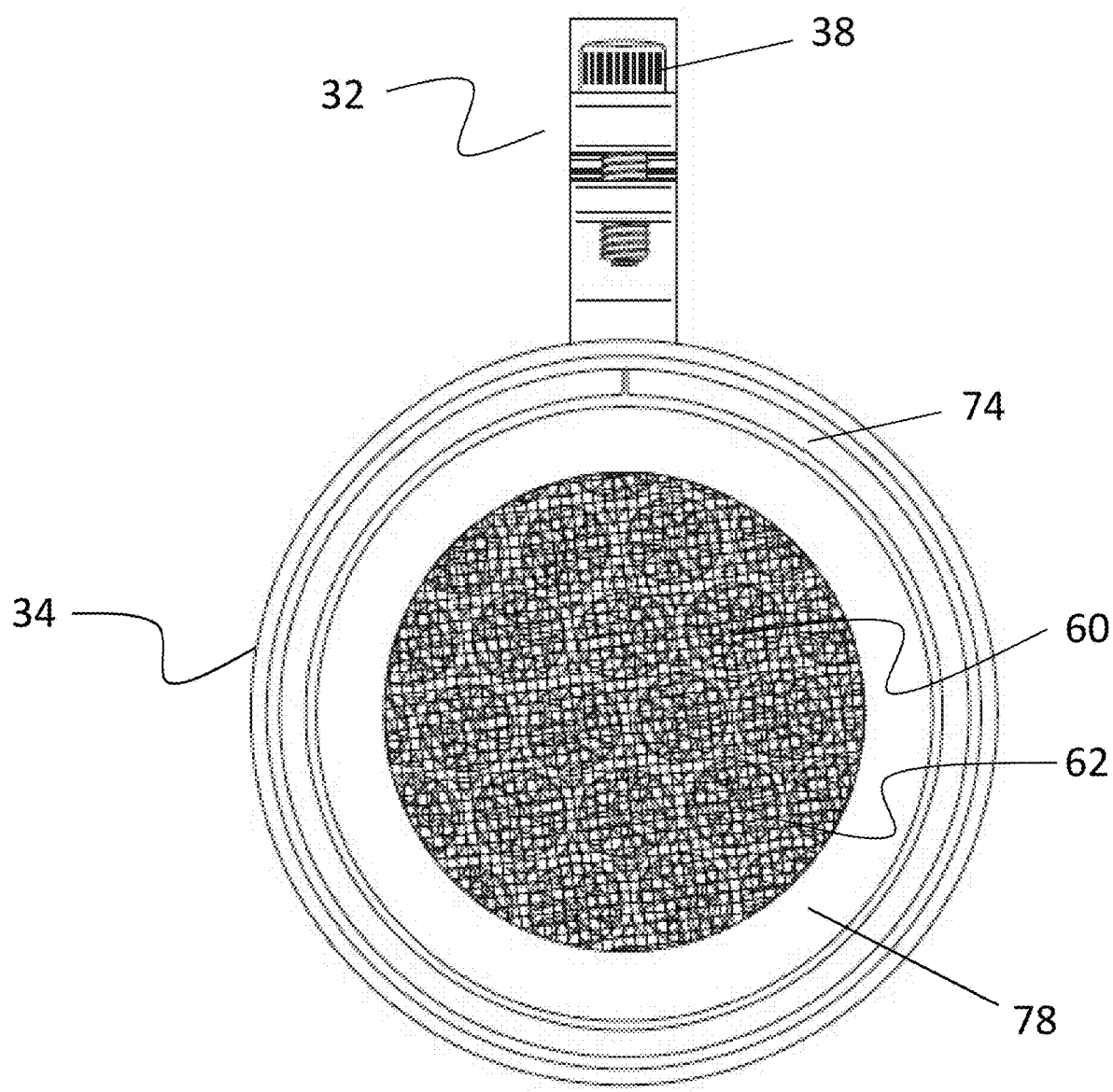
FIG. 4 is a rear view of the bicycle air filter of FIG. 2.

Turning to FIG. 4, rear view of the air filter is shown. As can be seen, the filter cartridge 35 is mounted in the frame 34. The filter cartridge includes activated carbon 60 (also referred to as actuated charcoal) positioned on the leeward side L. The activated carbon may be positioned within circular cells 62 or recesses within the filter body 64. A screen 64 covers the cells, trapping the activated carbon in the cells 62. The activated carbon is utilized to filter volatile organic compounds, odors, and other contaminants passing through the membrane 50.

As best shown in FIGS. 5 and 6, the frame 34 defines a tapered opening, whereby the windward side W of the tapered opening 70 is larger than the leeward side L of the tapered opening. In this regard, as the frame is circular in one embodiment, the diameter $D_W$ of the tapered opening on the windward side W is greater than the diameter $D_L$ of the tapered opening on the leeward side L.

Continuing with reference to FIGS. 5 and 6, the air filter cartridge 35 is insertable into the frame 34 and removable from the frame 34 along double arrow AA (see FIG. 5). It should be appreciated that due to the tapered opening, a wind force acting on the air filter cartridge on the windward side tends to wedge the air filter cartridge in the tapered opening. It should be appreciated that a high enough force can push the cartridge completely through the tapered opening. In this respect, the tapered opening with the large side facing the windward side simply causes a wind force to force the cartridge into the frame more so than a wind force exerted onto the cartridge from the leeward side.

Figure 7:
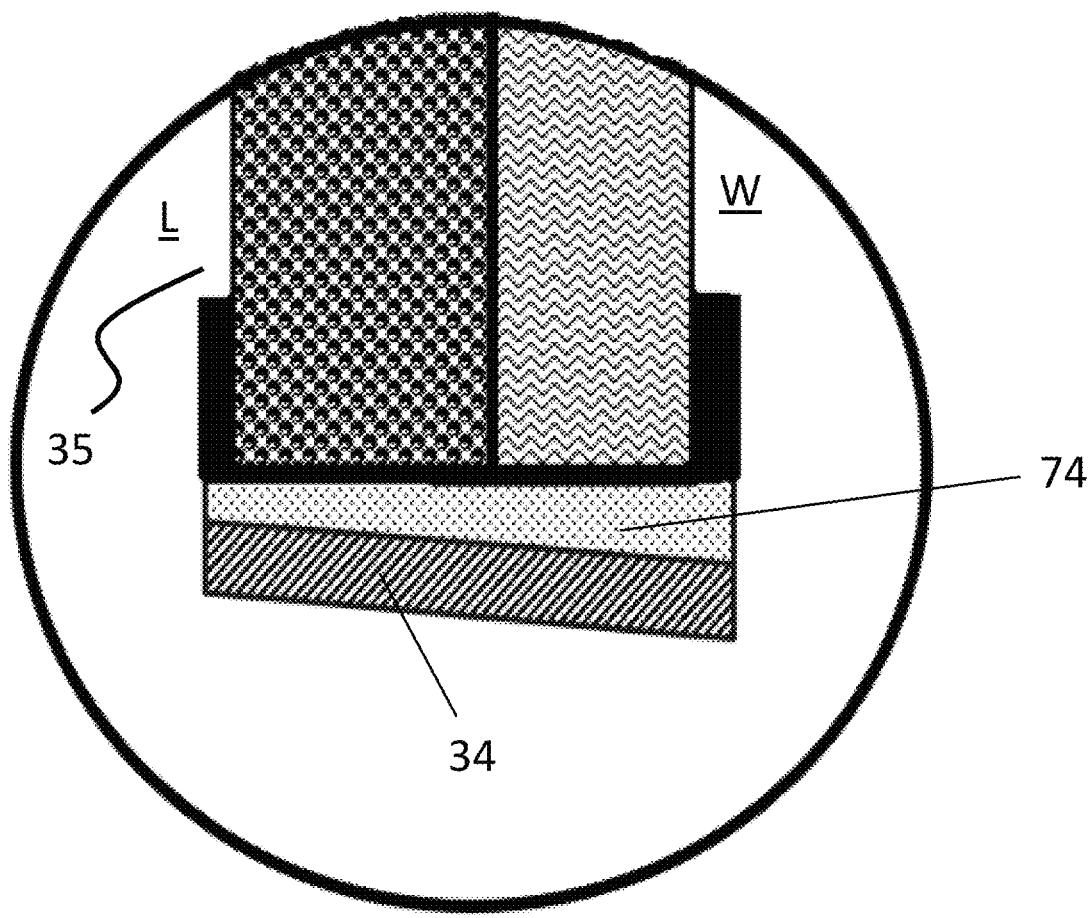
FIG. 7 is an enlarged view of the area encircled by line of FIG. 6.

In one embodiment, the air filter cartridge includes a foam member 74 disposed between the air filter cartridge and the frame. More specifically, the foam member is disposed about the periphery of the filter cartridge. The foam member is compressible so as to hold the air filter cartridge in the opening of the frame. The foam member 74 may completely circumscribe the entire circumference of the filter cartridge or may disposed at intermittent regions of the circumference. As best shown in the enlarged view of FIG. 7, the foam member compresses to a greater degree on the leeward side of the opening than on the windward side of the opening when the air filter cartridge is inserted into the frame.

As shown in FIG. 5, the filter cartridge includes the membrane 50 on one side and the activated carbon 60 on the other side. The periphery 76 of the cartridge may be formed of a cardboard material. Also, annular face members 78, 80, which may also be formed of cardboard, may be applied to the membrane side and to the activated carbon side, as shown.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An air filter assembly, comprising:
a body having a bracket and a frame, the bracket constructed and arranged to mount to a bicycle, the frame defining a tapered opening having a windward side and a leeward side, the tapered opening being larger on the windward side than on the leeward side;
a removable air filter cartridge mounted within the opening of the frame such that a force acting on the air filter on the windward side tends to wedge the air filter cartridge in the opening; and,
a foam member disposed between the air filter cartridge and the frame, the foam member being compressible so as to hold the air filter cartridge in the opening of the frame.

2. The air filter assembly of claim 1, wherein the foam member is attached to an outer periphery of the air filter cartridge.

3. The air filter assembly of claim 1, wherein the foam member compresses to a greater degree on the leeward side of the opening than on the windward side of the opening.

4. The air filter assembly of claim 1, wherein the air filter cartridge includes a first side and a second side, the first side of the air filter cartridge including a filter membrane and the second side of the air filter cartridge including activated carbon, the air filter cartridge being mounted into the opening such that the first side of the air filter cartridge is positioned on the windward side and the second side of the air filter cartridge is positioned on the leeward side.

5. The air filter assembly of claim 1, wherein the tapered opening is round and has a first diameter on the windward side and a second diameter on the leeward side, the first diameter being greater than the second diameter.

6. The air filter assembly of claim 1, wherein the bracket includes a first bracket piece integrally mounted to the frame and a second bracket piece fastenable to the first bracket piece.

7. The air filter assembly of claim 6, wherein the first bracket piece and the second bracket piece define a hinge end, the hinge end being constructed and arranged to allow the second bracket piece to move relative to the first bracket piece.

8. The air filter assembly of claim 1, wherein the air filter assembly is mountable to a handle bar of a bicycle.

9. The air filter assembly of claim 8, wherein the air filter assembly is mountable to the handle bar of the bicycle such that the frame is positioned downwardly.

10. An air filter assembly comprising:
a body having a bracket and a frame, the bracket constructed and arranged to mount to a bicycle, the frame defining a tapered opening having a windward side and a leeward side, the tapered opening being larger on the windward side than on the leeward side;
a removable air filter cartridge mounted within the opening of the frame such that a force acting on the air filter on the windward side tends to wedge the air filter in the opening; and,
wherein the bracket includes a first bracket piece integrally mounted to the frame and a second bracket piece fastenable to the first bracket piece,
wherein the first bracket piece and the second bracket piece define a hinge end, the hinge end being constructed and arranged to allow the second bracket piece to move relative to the first bracket piece, and
wherein the hinge end is constructed and arranged to allow the second bracket piece to be removed from the first bracket piece.

11. The air filter assembly of claim 10, wherein the first bracket piece and the second bracket piece define a fastener end, the fastener end being constructed and arranged to receive a removable fastener.

12. An air filter assembly, comprising:
a body having a bracket and a frame, the bracket constructed and arranged to mount to a bicycle, the frame defining a tapered opening having a windward side and a leeward side, the tapered opening being larger on the windward side than on the leeward side;
a removable air filter cartridge mounted within the opening of the frame such that a force acting on the air filter cartridge on the windward side tends to wedge the air filter cartridge in the opening, wherein the air filter cartridge includes a first side and a second side, the first side of the air filter cartridge including a filter membrane and the second side of the air filter cartridge including activated carbon, and wherein the air filter cartridge is mounted into the opening such that the first side of the air filter cartridge is positioned on the windward side and the second side of the air filter cartridge is positioned on the leeward side; and
a foam member attached to an outer periphery of the air filter cartridge and disposed between the air filter cartridge and the frame, the foam member being compressible so as to hold the air filter cartridge in the opening of the frame, wherein the foam member compresses to a greater degree on the leeward side of the opening than on the windward side of the opening.

13. The air filter assembly of claim 12, wherein the tapered opening is round and has a first diameter on the windward side and a second diameter on the leeward side, the first diameter being greater than the second diameter.

14. The air filter assembly of claim 12, wherein the bracket includes a first bracket piece integrally mounted to the frame and a second bracket piece fastenable to the first bracket piece, wherein the first bracket piece and the second bracket piece define a hinge end, the hinge end being constructed and arranged to allow the second bracket piece to move relative to the first bracket piece and to be removed from the first bracket piece, and wherein the first bracket piece and the second bracket piece define a fastener end, the fastener end being constructed and arranged to receive a removable fastener.

15. The air filter assembly of claim 12, wherein the air filter assembly is mountable to a handle bar of a bicycle and wherein the air filter assembly is mountable to the handle bar of the bicycle such that the frame is positioned downwardly.

16. An air filter assembly, comprising:
   a body having a bracket and a frame,
      the bracket constructed and arranged to mount to a bicycle, wherein the bracket includes a first bracket piece integrally mounted to the frame and a second bracket piece fastenable to the first bracket piece, wherein the first bracket piece and the second bracket piece define a hinge end, the hinge end being constructed and arranged to allow the second bracket piece to move relative to the first bracket piece and to be removed from the first bracket piece, wherein the first bracket piece and the second bracket piece define a fastener end, the fastener end being constructed and arranged to receive a removable fastener,
      the frame defining a tapered opening having a windward side and a leeward side, the tapered opening being larger on the windward side than on the leeward side, wherein the tapered opening is round and has a first diameter on the windward side and a second diameter on the leeward side, the first diameter being greater than the second diameter;
   a removable air filter cartridge mounted within the opening of the frame such that a force acting on the air filter cartridge on the windward side tends to wedge the air filter cartridge in the opening, wherein the air filter cartridge includes a first side and a second side, the first side of the air filter cartridge including a filter membrane and the second side of the air filter cartridge including activated carbon, and wherein the air filter cartridge is mounted into the opening such that the first side of the air filter cartridge is positioned on the windward side and the second side of the air filter cartridge is positioned on the leeward side; and
   a foam member attached to an outer periphery of the air filter cartridge and disposed between the air filter cartridge and the frame, the foam member being compressible so as to hold the air filter cartridge in the opening of the frame, wherein the foam member compresses to a greater degree on the leeward side of the opening than on the windward side of the opening,
   and wherein the air filter assembly is mountable to a handle bar of a bicycle such that the frame is positioned downwardly.

* * * * *